United States Patent [19]
Orts

[11] 3,737,996
[45] June 12, 1973

[54] METHOD OF MANUFACTURING THERMOCOUPLES

[75] Inventor: Donald H. Orts, Middletown, Ohio

[73] Assignee: Armco Steel Corporation, Middletown, Ohio

[22] Filed: Apr. 1, 1971

[21] Appl. No.: 130,266

[52] U.S. Cl. ................ 29/612, 29/471.1, 29/480, 219/58
[51] Int. Cl. ............................................. H01c 7/04
[58] Field of Search ............... 29/471.1, 475, 480, 29/612, 610; 219/56, 58, 107; 140/2

[56] References Cited
UNITED STATES PATENTS

| | | | |
|---|---|---|---|
| 1,324,024 | 12/1919 | Barnes | 140/2 X |
| 2,004,409 | 6/1935 | Hopkins | 219/56 X |
| 2,180,486 | 11/1939 | Tench | 219/58 X |
| 3,226,803 | 1/1966 | Samuels | 29/471.1 X |
| 3,263,305 | 8/1966 | Butler et al. | 29/610 X |
| 3,512,248 | 5/1970 | Nagy et al. | 29/471.1 X |

Primary Examiner—J. Spencer Overholser
Assistant Examiner—Richard Bernard Lazarus
Attorney—Melville, Strasser, Foster & Hoffman

[57] ABSTRACT

The rapid production of a continuous length of parallel wires intermittently welded along the length thereof, for use in apparatus such as thermocouples. The process for this operation comprises the steps of uncoiling two continuous lengths of wire, dissimilar in composition if used for thermocouples, and bringing same together into parallel and intimate contact in a longitudinal direction by means of opposed wheel electrodes, which wheels are circumferentially grooved so as to receive and hold said wires in intimate contact for intermittent welding along the length of said dual wire. To effect a separation of the welded dual wire into one or two individual units per weld, where each unit comprises a length of each said wire joined together at one end thereof by welding, a shear may be provided following the welding to sever the dual wire within the welded section, adjacent the welds, or intermediate the weld locations. This results in not only a system for the rapid production of welded wire such as used in thermocouples, but in an inexpensive and effective method which insures a controlled area junction for the joined wires.

7 Claims, 6 Drawing Figures

INVENTOR/S
DONALD H. ORTS

BY *Melville, Strasser, Foster and Hoffman*
ATTORNEYS

INVENTOR/S

DONALD H. ORTS

BY *Melville, Strasser, Foster and Hoffman*
ATTORNEYS

METHOD OF MANUFACTURING THERMOCOUPLES

BACKGROUND OF THE INVENTION

In the metal working and producing industries, or in any of the many fields where thermal treatments are involved in the development and study of new products, it is essential that the engineer and scientist know precisely the temperature during said thermal treatments.

By way of example, but without intending to so limit this invention, the metallurgist has long recognized the need to ascertain temperature changes, and to measure their effects on a given ferrous product. This information has enabled the researcher to develop new alloys, better thermal cycles, and to learn more about existing products. However, the key to these developments lay with the introduction of accurate means for measuring temperatures. To accomplish this, the industries have turned to the use of thermocouples.

The latter were developed following the recognition that certain non-electrical qualities, such as termperature, could be converted into electrical qualities that are proportional to the non-electrical quality. The electrical quality could then be measured at a location remote from the heat of the treating process.

For convenience in achieving a better understanding of this invention, but not intending to unduly impose limitations thereon, a typical thermoelectric pyrameter may be described as consisting of a pair of electrical conductors of dissimilar metals, i.e., a thermocouple, which if joined together at both ends and one junction is heated, an electromotive force is generated in the circuit. The electromotive force is a function of the temperature difference between the heated junction and the "cold" junction. Thus, if said "cold" junction is held constant, then the resultant electromotive force varies only with the temperature of the "hot" junction. A millivoltmeter may be included in said circuit to measure the electromotive force generated. Accordingly, by the proper selection of metals and alloys for the thermocouple wires, and by the determination of fixed circuit conditions, rather accurate measurements can be made over a very broad range of temperatures.

In the sampling or testing of a specimen of steel stock, a thermocouple, such as alumel-chromel, is welded to said specimen. After testing, the thermocouple is generally discarded. Thus, with material costs relatively fixed, the only area left for economizing is in manufacturing.

Heretofore, especially with fine gauge wire on the order of 30 ga., it was necessary to manually weld the junction of the thermocouple by crossing the wires forming an "X." The ends were then trimmed leaving a "V" with the weld joints at the apex. This procedure naturally required a high man-hour rate per thermocouple, whose ultimate life would be quite short. While the present invention does not extend such life, it provides a way to drastically reduce said man-hours to a reasonable and acceptable limit.

SUMMARY OF THE INVENTION

This invention relates in general to the production of a plurality of dual wire units, but more particularly to the production of thermocouples. While the latter represents the preferred product of this invention, it will be recognized that other applications may be found for same in the electronic field. Nevertheless, and without intent to unduly restrict this invention, the further discussion will be directed primarily to the production of thermocouples.

In brief, the method of this invention includes the steps of feeding a pair of wires from a source, such as a coil, in a given direction to a first location where the respective wires are brought into parallel and intimate contact in a direction longitudinally thereof, and welded at regular intervals along said dual wire. The feed of the wire is continued in the same general direction through a shearing station where the dual wire is severed into individual units whose longitudinal extent is no greater than the interval between said welds. Due to the broad weld area achieved by this process, it is possible to shear the wire within each weld zone, and at a position between adjacent weld zones, such that two individual units or thermocouples are produced for each weld in said dual wire. As a result, it is now possible to produce said units rapidly which heretofore required individual attention.

DETAILED DESCRIPTION OF THE INVENTION

The present invention relates to a procedure for making dual wire units, more particularly to thermocouples utilizing dissimilar wires. Said products are produced on a continuous basis and their production is limited only by the feed speeds of the respective wires.

It is now a well known operation to use thermocouples for the measuring of temperature or temperature differentials in the production and testing of a variety of products. Often the nature of the process or tests dictates a single use of the thermocouple. As a consequence, where a large number of units are used, an economical process had to be found to minimize the costs of said thermocouples. However, before proceeding with a discussion of the invention, it may be helpful to briefly review the function of a thermocouple.

If a pair of electrical wires of different composition are connected at two junctions to form a closed circuit, and the two junctions are held at different temperatures, a thermal electromotive force is produced between the two dissimilar wires which drives a current through the circuit. As the temperature differential changes, a proportional difference in the potential between said dissimilar wires follow. Accordingly, by imparting a known temperature to one of said junctions, and with the knowledge regarding the physical constants of the respective wires, it is possible to determine the temperature at the other junction or point of measurement of the thermocouple. That is, by including an electrical instrument such as a millivoltmeter to read the electromotive force generated, one can quickly determine the temperature difference between the two junctions by relating said readings to temperature values for said constants.

Figure 1:
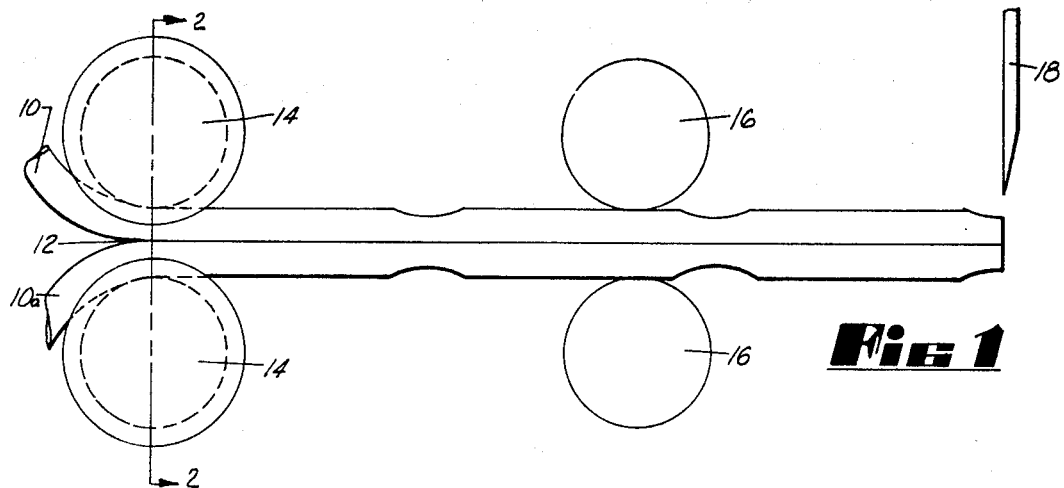
FIG. 1 is a schematic representation of the process of this invention to produce individual dual wire units, such as thermocouples.

With the foregoing in mind, let us now consider the present invention as it is illustrated in FIG. 1 hereof. Two wires 10, 10a are fed from some remote source, such as a reel, coil, spool or the like, and brought together at 12 in parallel and intimate contact in a longitudinal direction. The latter may be accomplished by means of circumferentially grooved electrode wheels 14 where the wires are intermittently welded as shown in FIG. 1. The feed of the dual wire is then continued in the same general direction by means of driven pinch rolls 16 through a shear station 18 where the severing of the dual wire into individual units such as thermocouples is effected.

It will be appreciated that the specific selection or combination of wires forms no limitation on this invention. It is well known to use certain combinations where a general range of temperatures will be employed for the process or tests. Nevertheless, the sets of wires may be selected from the group consisting of iron-constantan, alumel-chromel, and platinum-platinum-rodium.

Figure 2:
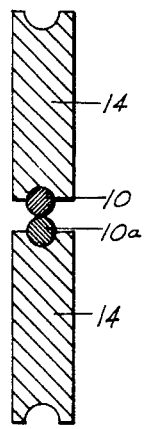
FIG. 2 is a sectional view taken along line 2 — 2 of FIG. 1.

FIG. 2 is a sectional view showing where the wires 10, 10a come together between the electrode wheels 14 for welding. It will be noted that said wheels show only a single groove, however, additional grooves may be provided if multiple operations are to be carried out at the same time. In any event, the electrode wheels are grooved such as shown to bring together and hold the wires in parallel and intimate contact for welding.

Figure 3:
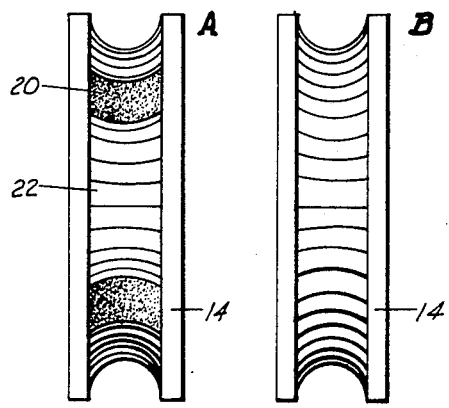
FIGS. 3A and 3B are enlarged end views of two embodiments of an electrode wheel used for welding the dual wires.

Since it is essential that the welding be effected at intervals along the longitudinal extent of the wires, means must be provided to accomplish this. FIGS. 3A and 3B represent two electrode wheels which can be used to accomplish the desired results. Looking first to the embodiments of FIG. 3A, it will be noted that the groove is provided with exposed copper positions 20 separated by insulation 22. By suitably spacing the copper positions 20, and synchronizing the rotation of the wheels 14, it is possible to energize said wheels 14 and weld the wires at the desired spacing along the length thereof. It will be understood that the size of the wheel and the spacing between the exposed copper positions 20 will dictate the length of the interval wherein the wires are free from welding.

A second embodiment is shown in FIG. 3B and this employs a continuously exposed copper groove. However, when using such a wheel 14, one can effect the intermittent welding by utilizing an electrical impulse on said wheel, the timing of which impulse is directly related to the speed of the moving wires 10, 10a. Thus, whether the electric current applied to said wheels 14 is constant or periodic, it is possible to effect the intermittent welding desirable in this case.

Figure 4:
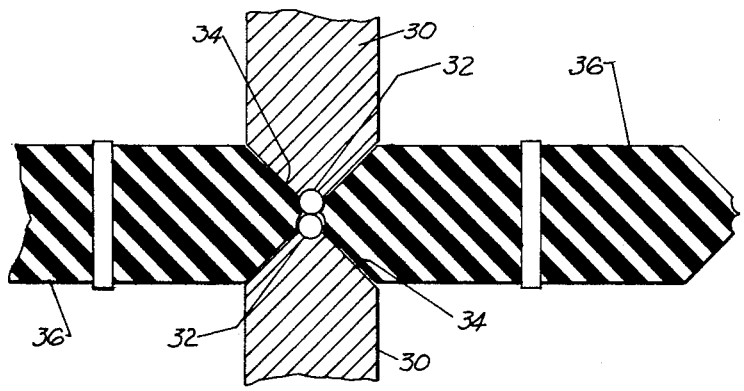
FIG. 4 is an enlarged sectional view of a further embodiment of the electrode wheels welding small diameter wires, said welding being assisted by wire alignment rolls.

It is not unusual in the manufacturing of thermocouples to require small diameter wire on the order of 30 ga. One difficulty was discovered in attempting to hold the wires in alignment. FIG. 4 represents one method whereby the problem was overcome. Here the electrode wheels 30 are provided with circumferential grooves 32, but in addition thereto, each have tapered surfaces 34 at about 45° from the axes of said electrode wheels. The taper may actually vary between about 30° and 60°.

To hold the wires in alignment during the intermittent welding thereof, side guide rolls 36, tapered so as to compliment the tapered surfaces 34 of the electrode wheels 30, are provided in the manner shown in FIG. 4. The guide rolls 36, which are constructed of non-conducting material, are disposed in a first plane perpendicular to the plane of wheels 30. They are spring loaded and movable within said first plane, such that when said electrode wheels 30 are brought into a welding position, the rolls 36 retract slightly so as to receive the wires to be welded. This maintains a slight but sufficient pressure on the wires so as to maintain the parallel and intimate contact as described and illustrated herein.

Figure 5:
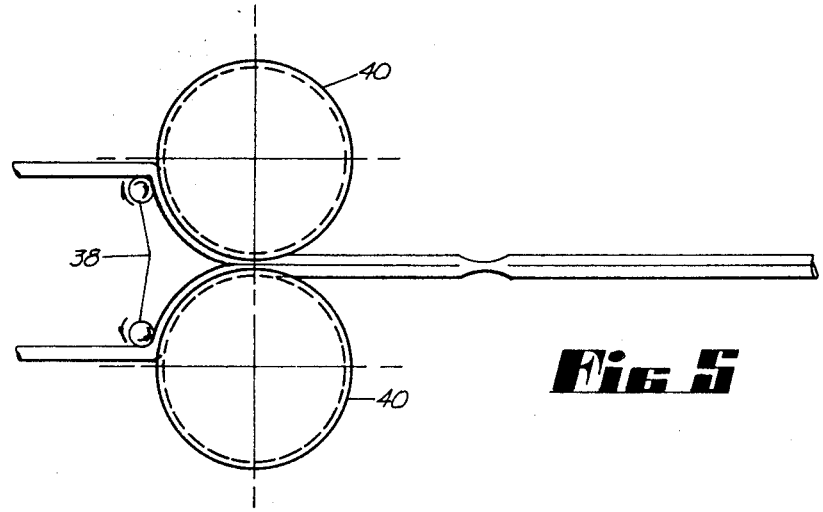
FIG. 5 is a schematic representation of a wire feed assistance modification to the process herein.

It has also been discovered in the process of this invention that tension on the wires may cause wire breakage or separation during the welding of the dual wires. Accordingly, to minimize the tension in the wire, driven wire feed rolls 38 may be provided, such as illustrated in FIG. 5. Said rolls are driven at a feed rate substantially equal to the feed rate of the adjacent electrode rolls 40.

Figure 6:
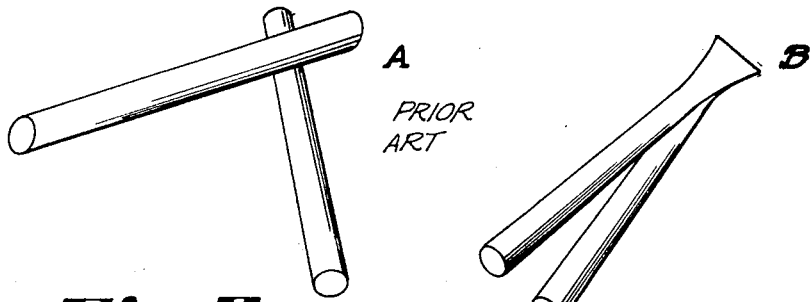
FIGS. 6A and 6B represent the prior art and the product of this invention, respectively. In the latter case, the welded and trimmed dual wire unit has been spread apart at one end to represent a condition for immediate use.

One of the primary advantages of the present invention is the ability to achieve a controlled weld area or contact between the wires, as contrasted to the prior art. In this regard reference may be made to FIGS. 6A and 6B. Heretofore, it was necessary to prepare a thermocouple by crossing two dissimilar wires and welding same to result in an "X." The tips were then trimmed to form a "V." By crossing the wires in this way, only a limited contact is achieved between the overlapping wires. However, by arranging the wires in the manner of the present invention, it is possible to get a controlled area contact without resorting to additional pressures and welding current for the operation. In fact, the weld area is sufficiently broad to permit a severing of the wires at the center of the weld joint. The resulting "half weld" is sufficient to form a suitable junction for the thermocouple. Thus, by severing the dual wire at the joint, it is possible to produce two thermocouples per weld along the wire. On the other hand, if a broader joint is required, the severing can be done adjacent to the weld.

While the invention has been described with respect to its most preferred embodiment, it is contemplated that various changes and modifications may be made without departing from the spirit and scope of this invention. Therefore, no limitation is intended to be imposed herein except as set forth in the appended claims.

The embodiments of the invention in which an exclusive property or privilege is claimed are defined as follows:

1. A method of producing an intermittently welded, continuous length of dual wire welded at one end thereof from a pair of continuous strands of wire each of the wires being of a composition different from the other, comprising the steps of feeding said wires in a given direction from a source to a first location, bringing said wires into parallel and intimate contact at said first location in a direction longitudinally thereof, welding said wires at regular intervals along said dual wire while said wires are in parallel and intimate contact, and shearing the wires so as to form individual thermocouples.

2. The method claimed in claim 1, wherein the intermittent welding takes place at said first location.

3. The method claimed in claim 1, wherein the movement of said wire is continued away from said first location to a second location and sheared into individual units.

4. The method claimed in claim 1, wherein said wires comprise platinum and an alloy of platinum and rhodium, respectively.

5. The method claimed in claim 1, wherein said wires comprise alumel and chromel.

6. The method claimed in claim 3 wherein the longitudinal extent of each sheared unit is no greater than the interval between said welds, and shearing cuts are taken adjacent said welds.

7. The method claimed in claim 3 wherein the longitudinal extent of each sheared unit is approximately one-half the distance between adjacent welds, and alternate shearing cuts are taken within and intermediate said welds.

* * * * *